INVENTORS
LESLIE C. LANE, JR.,
RICHARD W. HAMILTON,
BY
Charles L. Harness
ATTORNEY June 26, 1951 L. C. LANE, JR., ET AL 2,557,980
PREPARATION OF DITHIOBIURET Filed March 15, 1949 3 Sheets-Sheet 3

INVENTORS
LESLIE C. LANE, JR.,
RICHARD W. HAMILTON,
BY
Charles L. Harness
ATTORNEY Patented June 26, 1951

2,557,980

UNITED STATES PATENT OFFICE 2,557,980

PREPARATION OF DITHIOBIURET

Leslie C. Lane, Jr., Stamford, and Richard W. Hamilton, Norwalk, Conn., assignors to American Cyanamid Company, New York, N. Y., a corporation of Maine Application March 15, 1949, Serial No. 81,463

19 Claims. (Cl. 260—552)

The present invention relates to the preparation of dithiobiuret.

It is an object of the invention to prepare dithiobiuret by reacting metallic dicyanimides and hydrogen sulfide. It is a particular object to prepare dithiobiuret in a manner not requiring the use of pressure apparatus.

The invention also contemplates the production of dithiobiuret from a solution of calcium dicyanimide that also contains calcium chloride as a by-product in the preparation of said calcium dicyanimide, and it is one object of this invention to proceed from calcium cyanamide and cyanogen chloride, with the addition of hydrogen sulfide at an intermediate stage, finally to dithiobiuret, without the use of solid calcium dicyanimide at any stage of the process.

Additional objects will appear from the description of the invention hereinafter.

It has been found that dithiobiuret may be obtained by warming an aqueous solution or suspension of a metal dicyanimide with hydrogen sulfide. Cyanothiourea first forms and reacts with more hydrogen sulfide to yield dithiobiuret. Unreacted cyanothiourea may be separated from the final product as described hereinafter.

The following reactions are postulated:

(1)
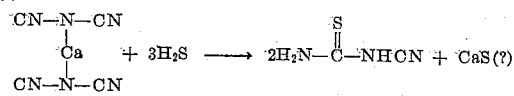

(2)
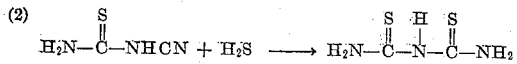

The product CaS is queried because it is ordinarily insoluble in water. In the present reaction, however, no metallic sulfide or other metallic compound precipitates, and it is assumed that if CaS is formed, it is retained in solution as an unidentified complex. In any event, the metallic part of the dicyanimide remains in solution during the subsequent working up of the reaction mass and does not interfere with the recovery of either dithiobiuret or cyanothiourea.

A stock solution of calcium dicyanimide suitable as a starting material for the addition of hydrogen sulfide in some of the examples that follow may be prepared by slurrying crude calcium cyanamide with cyanogen chloride in water, filtering, and using the thus-formed solution of calcium dicyanimide and calcium chloride as the reaction menstruum. This is probably the most economical method of conducting the process.

PREPARATION OF STOCK SOLUTION OF CALCIUM DICYANIMIDE

| Reactants | Molar Ratio |
| --- | --- |
| Cyanogen chloride | 1.0 |
| Crude calcium cyanamide (58%) | 1.0 |
| Water | 27.8 |

The cyanogen chloride is carefully added to the agitated aqueous slurry of crude calcium cyanamide at a rate of about 1 mol per 0.5 hour. The temperature range is substantially 28°–30° C. and the cyanogen chloride is absorbed readily. As soon as exothermic tendencies stop, the reaction mixture is neutralized with dilute hydrochloric acid. The insoluble impurities are removed and a clear, slightly yellow filtrate is obtained, which contains mainly calcium dicyanimide and calcium chloride. The calcium chloride does not interfere with subsequent production of dithiobiuret.

Various modifications of the invention are more fully described in the following examples.

Example 1

OPEN FLASK METHOD

Owing to the high solubility of calcium dicyanimide in water (up to 47% at 25° C.) a wide range of concentrations is available.

A 10.3% aqueous solution containing 47.8 grams of calcium dicyanimide (both figures were arbitrary) was placed in a one-liter three-neck flask equipped with a stirrer, reflux condenser, thermometer, and sintered glass disc gasifier for hydrogen sulfide addition. The hydrogen sulfide was passed rapidly into the vigorously stirred solution for three hours, during which time the solution was held at a temperature of 95° C. No attempt was made to control the pH of the solution, which was about 8.4 initially and which had risen to about 10 by the end of the reaction. The solution was then placed in an ice-bath and cooled to about 5° C., whereupon dithiobiuret was precipitated.

Figure 1:
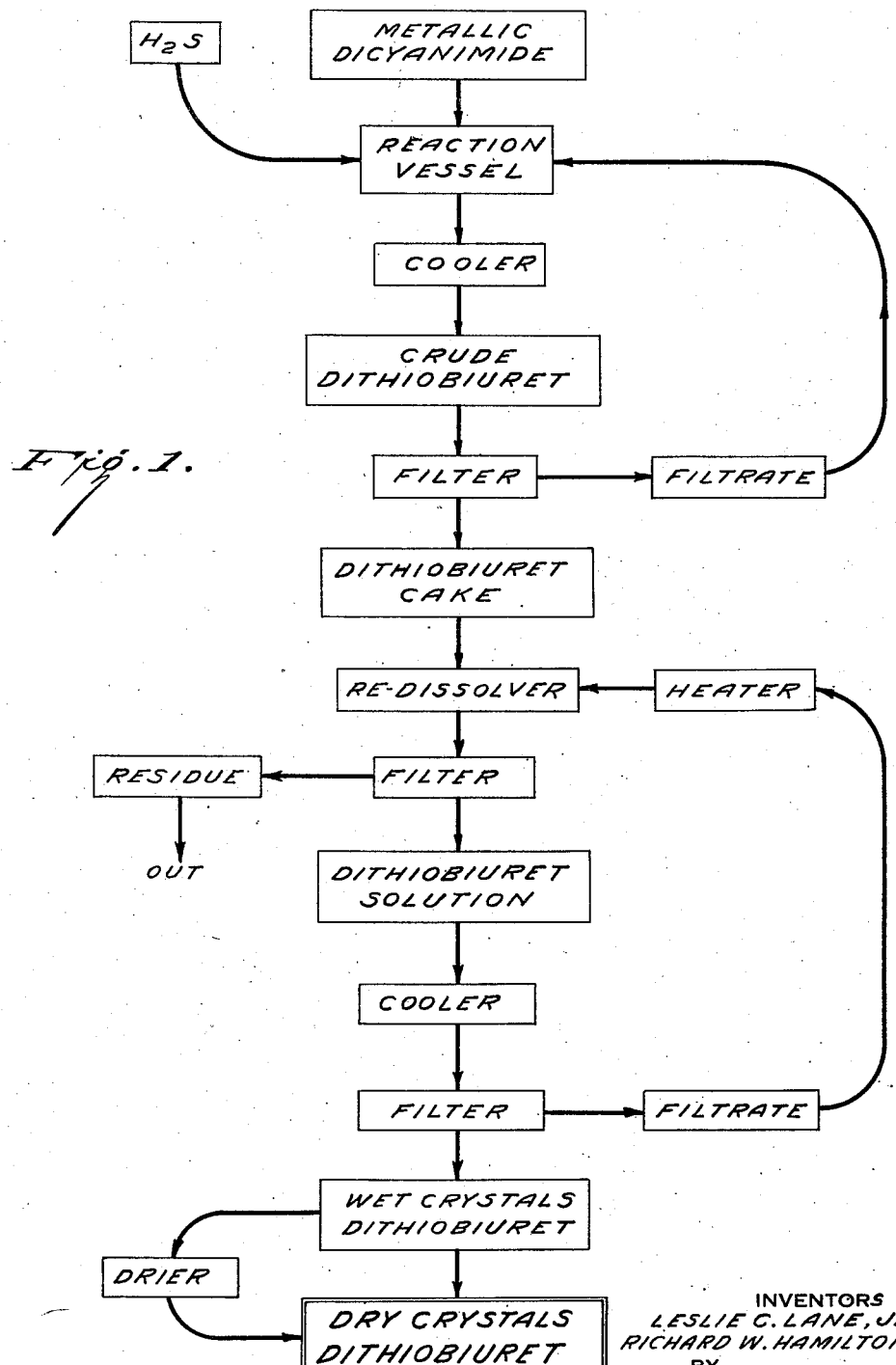
Figure 1 is a flow chart showing one embodiment of the invention.
Figure 2:
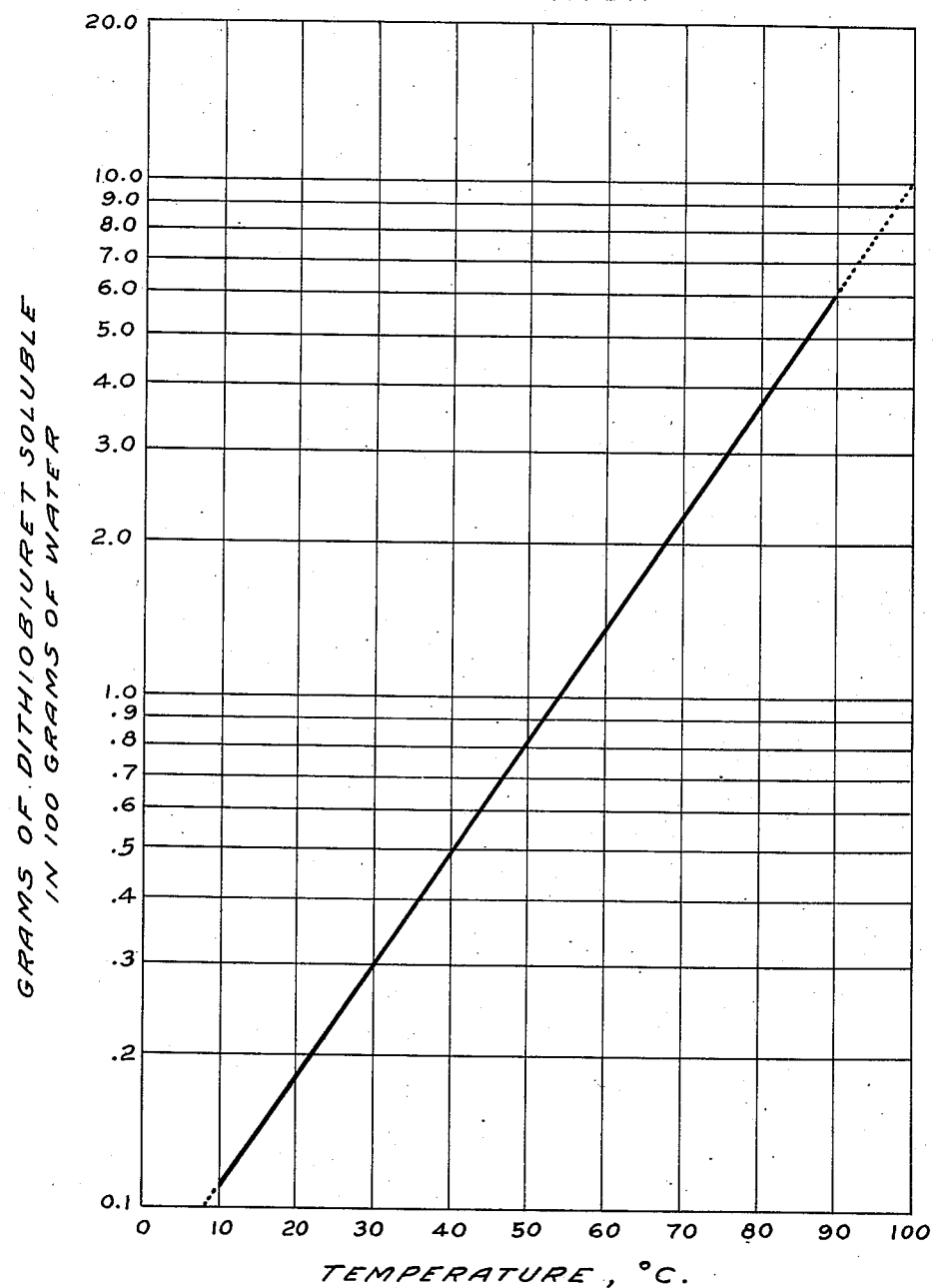
Figure 2 represents the solubility curve of dithiobiuret in water.

(A precipitate may be obtained at temperatures higher than 5° C., in an amount readily predictable from the known solubility of dithiobiuret, as shown in Fig. 2. The best recoveries are obviously obtained at the lower temperatures.) An additional amount of precipitate was obtained by acidifying the solution with hydrochloric acid or the like to a pH of about 2–3. (Acidification may be carried out either before or after chilling.) The solution was allowed to stand for about half an hour to permit the growth of larger crystals and the crude precipitate, comprising essentially dithiobiuret and cyanothiourea, was filtered off. The filter cake was dissolved in a minimum amount of boiling water to convert any cyanothiourea present to an insoluble substance of unknown composition, diatomaceous earth was added as a clarification agent, and the solution was filtered and cooled slowly to room temperature, whereupon crystals of dithiobiuret formed. These crystals were filtered off, dried, and weighed. The yield was 32.8 grams, 44% of theoretical.

The time of reaction is critical, for if a reaction conducted at 95° C. is stopped before 1½ hours, little or no dithiobiuret is obtained. However, excellent yields are obtained after a reaction of two hours, and the optimum yields are obtained at about three hours. From that point on, the yields tend to decrease, and after five hours the yields become rather low.

The temperature of reaction is also critical. Below 65° C., unless the reaction is continued for an unusually long period, the yield of dithiobiuret is quite low, increasing as the temperature approaches 100° C.

In some instances enough cyanothiourea may remain unconverted to make its recovery worth while. In this case, after the reaction is stopped, it is chilled to 5°–10° C., the pH adjusted to about 10 by addition of sodium hydroxide, ammonia, or the like, if it is not already about 10, (cyanothiourea being soluble in cold alkaline solution and dithiobiuret relatively insoluble), the resulting precipitate of dithiobiuret is removed, the solution is acidified with hydrochloric acid or the like to a pH of 2–3 to cause cyanothiourea to precipitate, and the same is recovered.

In an alternate method the reaction is stopped, the solution chilled to 5°–10° C. and acidified to a pH of 2–3 to precipitate both dithiobiuret and cyanothiourea; the precipitate is recovered and slurried in a neutral solution or one made alkaline by the addition of sodium hydroxide, ammonia, or the like, up to a pH of about 10 to redissolve cyanothiourea, undissolved dithiobiuret is removed, the solution is acidified to a pH of about 2–3 to precipitate cyanothiourea, and the same is recovered.

Example 2

FORMATION OF HYDROGEN SULFIDE IN SITU

Instead of adding hydrogen sulfide to the reaction mass through a sintered glass gasifier, it may be added to the reaction mass by formation in situ. The following procedure is typical of various processes that may be used when hydrogen sulfide is to be formed in solution. The calcium dicyanimide solution is placed in a flask equipped with a stirrer, reflux condenser, thermometer, and two dropping funnels with stems reaching nearly to the bottom of the vessel. As the solution is heated and stirred, a 40% aqueous solution of sodium sulfhydrate, NaSH, and concentrated hydrochloric acid are added slowly through their respective dropping funnels at a rate such that the pH remains as nearly as possible at 8–9. An excess of sodium sulfhydrate is preferred, in which event some of the hydrogen sulfide generated in situ is not absorbed, but will escape from the reaction vessel via the reflux condenser. Isolation of the product is carried out as in the preceding example. Slightly better yields are obtained by this method of adding hydrogen sulfide.

In a specific example, 47.8 grams of calcium dicyanimide in 470 grams of solution were prepared and placed in the flask as above noted, and then 102.2 grams of sodium sulfhydrate were added simultaneously with the addition of 185 grams of 37% hydrochloric acid. The reactants were maintained at a temperature of 95° C. for about three hours, and the pH was maintained within the range 7.9 (initial)–8.7 (final), giving a yield of 47.7 grams of dithiobiuret, 64% of theoretical. While the pH range may vary, the range of about 8–9 is preferred, and this range may be maintained by varying the addition of the sodium sulfhydrate and hydrogen sulfide.

The method of using hydrogen sulfide formed in situ has the commercial advantage of being considerably cheaper than using hydrogen sulfide from a tank supply.

Example 3

METHOD USING REACTION TOWER

Figure 3:
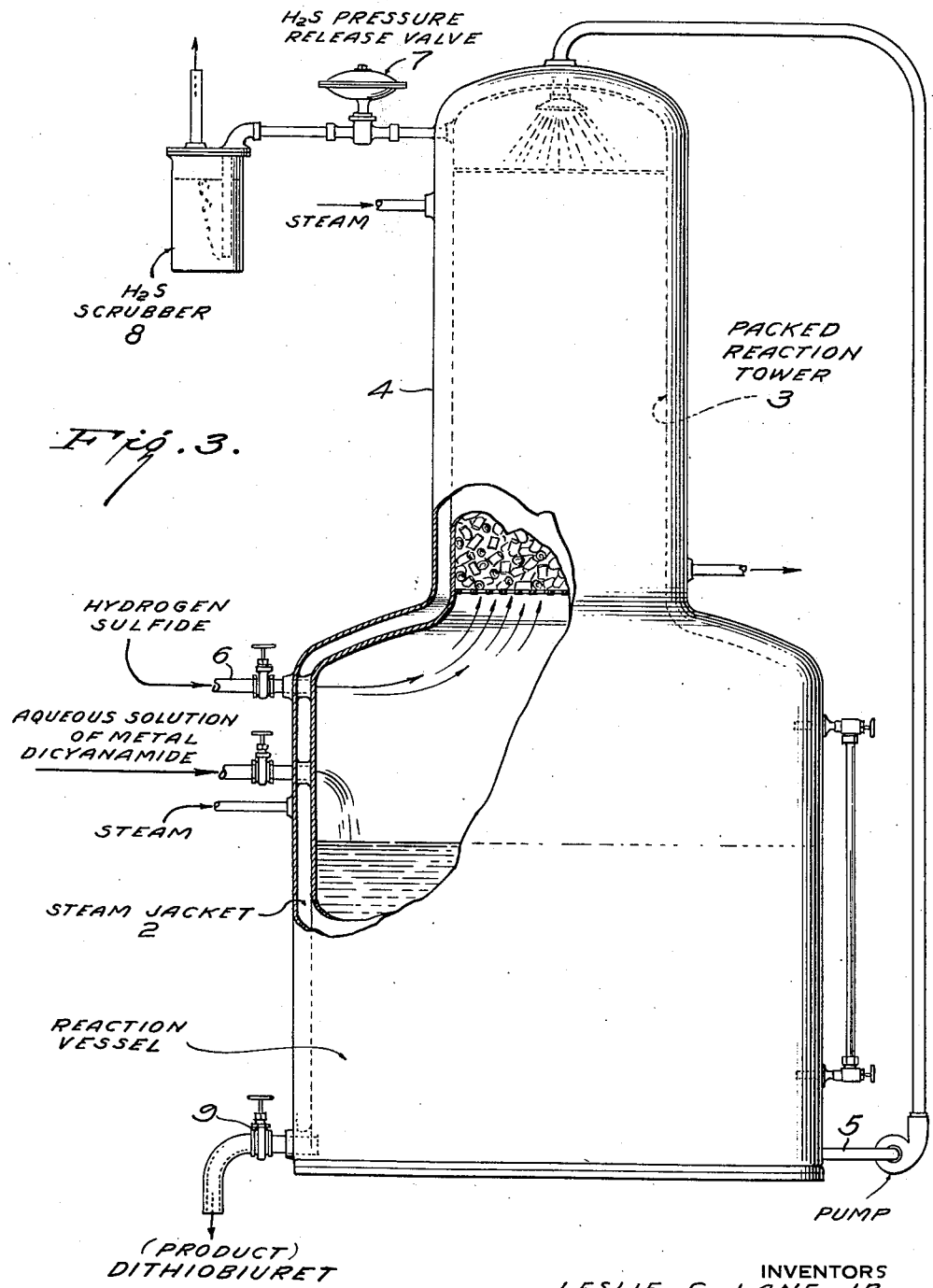
Figure 3 shows an apparatus for continuously conducting the process of the present invention.

Another method of preparing dithiobiuret according to the principle of this invention is shown diagrammatically in Fig. 3, and is more fully described as follows:

An aqueous solution of calcium dicyanimide is run into reaction vessel 1, which is heated by steam jacket 2 or the like. A reaction tower 3 packed with Berl rings or similar contact surface materials and heated by steam jacket 4 or the like is connected to vessel 1 from above. To the bottom of the vessel is attached a lagged line 5 to permit the continuous pumping of the solution from the vessel into the reaction tower. Simultaneously hydrogen sulfide is passed into the vessel, through duct 6, and it rises into the reaction tower and reacts with the calcium dicyanimide solution flowing down through the tower packing. The $H_2S$ pressure release valve 7 of any well-known design is adjusted to release $H_2S$ into $H_2S$ scrubber 8 at a pressure slightly over atmospheric (indicating substantial completion of the reaction), in which event, in a batch-wise operation, the reaction mass is removed from the vessel through duct 9. Using this embodiment, 119 parts by weight of calcium dicyanimide were dissolved in 750 parts by weight of water, and the solution was run into a vessel connected to a reaction tower as above described, and continuously pumped from the vessel into the tower, while simultaneously an excess of hydrogen sulfide was forced into the vessel and permitted to rise through the tower. The reaction was continued for about 1½ hours, during which period the system was maintained at a temperature of approximately 93°–95° C. No attempt was made to control the pH of the system, which was 8.4 in the beginning and 10.2 at the end of the period. The yield of dithiobiuret was 98 grams, 53% of theoretical. Some hydrogen sulfide was consumed in the production of various impurities and in reacting with side products. The tower process is run continuously by pumping off the product continuously while pumping hydrogen sulfide and metal dicyanimide continuously into the vessel 1. The rates of addition of reactants and removal of product are preferably adjusted to maintain a slightly superatmospheric pressure of hydrogen sulfide in the system.

In the packed-tower batch method of preparing dithiobiuret, the time of reaction is critical, a reaction period of one hour being insufficient for good yields. Thus, when the system as described above was reacted for one hour, a yield of only 5.4% of dithiobiuret was obtained. In another experiment the system was reacted for two hours with a yield of 50% dithiobiuret.

It is preferred to maintain the temperature at around 100° C. when using this method of preparation. For example, if a temperature of approximately 86°-88° C. is used, the reaction being carried out batch-wise for three hours, the yield of dithiobiuret is decreased. In one experiment under these conditions a yield of only 25% was obtained.

The proportions of the absorption column may vary widely, due regard being given to efficient absorptiton of hydrogen sulfide. In this and in the preceding methods, it is preferred that the hydrogen sulfide be in contact with the reaction mass during the entire heating period. If the addition of hydrogen sulfide is stopped and heating is continued, the yield of dithiobiuret drops.

Example 4

DICYANIMIDES OTHER THAN CALCIUM

Although in the above examples it has been shown that calcium dicyanimide may be reacted with hydrogen sulfide to yield dithiobiuret, the reaction is by no means limited to this salt, but may be modified easily for use with other metallic dicyanimides, including ammonium dicyanimide and others illustrated below.

Dicyanimides of the metals of groups I and II of the periodic table as shown on pp. 54-55, Lange's Handbook of Chemistry, 5th ed., are typical of the dicyanimides available for the process of the invention.

Ammonium dicyanimide, prepared from calcium dicyanimide and ammonium sulfate, was reacted with hydrogen sulfide in an open flask at 95° C. for three hours. A 40% yield of dithiobiuret was obtained.

Magnesium dicyanimide, prepared from calcium dicyanimide and magnesium sulfate, was reacted with the theoretical amount of hydrogen sulfide in an autoclave at 80° C. for forty-five minutes. A 60% yield of dithiobiuret was obtained.

Sodium or potassium dicyanimide was also used in analogous reactions, with good yields of dithiobiuret.

The dicyanimides above discussed are water soluble, but this property is not a requisite for the preparation of dithiobiuret. For example, zinc dicyanimide, which is relatively insoluble, was prepared from calcium dicyanimide and zinc chloride and was slurried in water made alkaline with 5% by weight of ammonia, based on the weight of the zinc dicyanimide used. Slightly less than the theoretical amount of hydrogen sulfide was added, and the mixture was heated to 80° C. for forty-five minutes. A 60% yield of dithiobiuret was obtained. While a small amount of dithiobiuret may be obtained without making the solution alkaline, the yield is increased if the pH is in excess of 7.

Example 5

METHOD USING AUTOCLAVE

While it is a particular advantage of the present process that an autoclave is not required for the preparation of dithiobiuret, the best yields are obtained under superatmospheric pressure. A 10.3% solution of calcium dicyanimide containing 20.6 grams of calcium dicyanimide was placed in a 310-cc. autoclave, to which was attached a small transfer bomb containing 12.2 grams of hydrogen sulfide, the theoretical amount. The hydrogen sulfide was forced from the transfer bomb into the autoclave by the application of heat, the valves of the transfer bomb and the autoclave were closed, and the transfer bomb was disconnected. The autoclave and its contents were heated to about 80° C. with rocking until the hydrogen sulfide was completely absorbed, as indicated by a pressure gauge reading of zero, which in this case required forty minutes. The highest pressure recorded was 570 p. s. i. The autoclave was then cooled rapidly, vented and the contents removed. Dithiobiuret was isolated as in the preceding examples, the yield being 29.2 grams, or 90.7%. Yields of the same order may be obtained by reducing the temperature a little and increasing the pressure considerably. Thus, at 75° C. and 900 pounds per square inch, a yield of 89% was obtained.

For the autoclave method, the temperature and pressure cited in the preceding paragraph are approximately optimum. For example, if the same temperature is used but with a lower pressure, in the range of 280 lb./sq. in., the yield drops to 75%. Similarly, if the pressure is maintained at about 500 p. s. i. but the temperature is decreased to about 65° C., the yield is decreased, 66.1% being typical. Two additional examples showing variations from the temperatures and pressures above given are as follows: When a high temperature of 95° C. was used with a pressure of 300 p. s. i., a 23.3% yield was obtained. At a temperature of 110° C. and a pressure of 50 p. s. i., i. e., in addition to atmospheric pressure, a yield of 38.2% was obtained.

While the invention has been described with particular reference to specific embodiments, it is to be understood that it is not to be limited thereto but is to be construed broadly and restricted solely by the scope of the appended claims.

We claim:

1. The method comprising heating a metal dicyanimide, water, and hydrogen sulfide at a temperature of at least 55° C., at a pH in excess of 7 but not exceeding about 10.2 whereby a reaction mass comprising dithiobiuret is formed.

2. The method according to claim 1 in which the metal is a member of group II—A of the periodic table.

3. The method according to claim 1 in which the dicyanimide is calcium dicyanimide.

4. The method according to claim 1 in which the dicyanimide is sodium dicyanimide.

5. The method according to claim 1 in which the dicyanimide is ammonium dicyanimide.

6. The method comprising heating a metal dicyanimide, water, and hydrogen sulfide to a temperature of at least 55° C., at a pH in excess of 7 but not exceeding about 10.2 whereby a reaction mass comprising substantially dithiobiuret and cyanothiourea is formed, and recovering the thus-formed dithiobiuret and cyanothiourea.

7. The method according to claim 6 in which the metal is a member of group II—A of the periodic table.

8. The method according to claim 6 in which the dicyanimide is calcium dicyanimide.

9. The method according to claim 6 in which the dicyanimide is sodium dicyanimide.

10. The method according to claim 6 in which the dicyanimide is ammonium dicyanimide.

11. The method comprising heating a metal dicyanimide, water, and hydrogen sulfide at a temperature of at least 55° C., at a pH in excess of 7 but not exceeding about 10.2 whereby dithiobiuret and cyanothiourea are formed, cooling the reaction mass to precipitate dithiobiuret and cyanothiourea, and isolating the thus-formed dithiobiuret and cyanothiourea from the reaction mass and from each other.

12. The method comprising heating a metal dicyanimide, water, and hydrogen sulfide at a temperature of at least 55° C., at a pH in excess of 7 but not exceeding about 10.2 whereby dithiobiuret and cyanothiourea are formed, cooling the reaction mass to a temperature below about 5° C., acidifying the reaction mass to a pH within the range of about 2 to about 3, whereby dithiobiuret and cyanothiourea are precipitated from solution, and isolating the last two products from the reaction mass and from each other.

13. The method comprising heating a metal dicyanimide, water, and hydrogen sulfide at a temperature of at least 55° C., at a pH in excess of 7 but not exceeding about 10.2 whereby dithiobiuret and cyanothiourea are formed, acidifying the reaction mass to a pH within the range of about 2 to about 3, cooling the reaction mass to a temperature below about 5° C., whereby dithiobiuret and cyanothiourea are precipitated from solution, and isolating the thus-formed dithiobiuret and cyanothiourea from the reaction mass and from each other.

14. The method of separating dithiobiuret from a mixture comprising dithiobiuret and cyanothiourea which includes the steps of subjecting said mixture to the action of water at a temperature of at least 95° C., whereby dithiobiuret is dissolved but cyanothiourea is converted into an insoluble substance, removing said insoluble substance from solution, cooling the solution to precipitate dithiobiuret, and removing the thus-precipitated dithiobiuret from solution.

15. The method of separating dithiobiuret from a mixture comprising dithiobiuret and cyanothiourea which includes the steps of subjecting said mixture to the action of water with heating until the evolution of gas ceases, whereby dithiobiuret is dissolved, removing solids from the solution, cooling the solution to precipitate dithiobiuret, and removing the thus-precipitated dithiobiuret from solution.

16. The method comprising heating a metal dicyanimide, water, and hydrogen sulfide in a closed reaction zone, whereby dithiobiuret is formed, and recovering the thus-formed dithiobiuret.

17. The method comprising heating calcium dicyanimide, water, and hydrogen sulfide at a temperature of at least 60° C., under superatmospheric pressure, for about 40 minutes.

18. The method comprising subjecting an aqueous solution of a metal dicyanimide to the action of hydrogen sulfide in a liquid-vapor contact tower at a temperature of at least 55° C. and recycling the solution at a pH in excess of 7 but not exceeding about 10.2 until the dicyanimide is substantially converted to dithiobiuret, and recovering the thus-formed dithiobiuret.

19. The method of preparing dithiobiuret which comprises forming an aqueous slurry of crude calcium cyanamide, mixing said slurry with cyanogen chloride, maintaining the reaction mixture at a temperature between 0°–50° C. until calcium dicyanimide is formed, separating insoluble impurities from the reaction mass, adjusting the pH of the remaining solution to 8–10, adding hydrogen sulfide to form dithiobiuret, cooling the solution to a temperature below about 10° C., whereby dithiobiuret is precipitated, and recovering the thus-precipitated dithiobiuret.

LESLIE C. LANE, JR.
RICHARD W. HAMILTON.

REFERENCES CITED

The following references are of record in the file of this patent:

UNITED STATES PATENTS

| Number | Name | Date |
| --- | --- | --- |
| 2,371,112 | Sperry | Mar. 6, 1945 |
| 2,410,862 | Bousquet et al. | Nov. 12, 1946 |

OTHER REFERENCES

Wunderlich, "Ber. deut. Chem.," vol. 19 (1886), p. 453 to 454.

Fromm, "Ber. deut. Chem.," vol. 55 (1922), p. 808.

Short, "Chem. News," vol. 126 (1923), pp. 100 to 101.

Franklin, "Nitrogen System of Compounds," (1935), pps. 100, 122 to 123.